(12) United States Patent
Reuter et al.

(10) Patent No.: US 7,905,334 B2
(45) Date of Patent: Mar. 15, 2011

(54) PARTIALLY LINED DISK BRAKE

(75) Inventors: Manfred Reuter, Weilmünster (DE); Jürgen Balz, Hünstetten-Oberlibbach (DE); Ralph Petri, Sulzbach (DE); Sebastian Satzmann, Maintal (DE); Dirk Eser, Bad Soden (DE)

(73) Assignee: Continental Teves AG & Co. oHG (DE)

( * ) Notice: Subject to any disclaimer, the term of this patent is extended or adjusted under 35 U.S.C. 154(b) by 782 days.

(21) Appl. No.: 11/794,368

(22) PCT Filed: Jan. 18, 2006

(86) PCT No.: PCT/EP2006/050287
§ 371 (c)(1), (2), (4) Date: Jun. 28, 2007

(87) PCT Pub. No.: WO2006/077227
PCT Pub. Date: Jul. 27, 2006

(65) Prior Publication Data
US 2008/0110703 A1    May 15, 2008

(30) Foreign Application Priority Data

Jan. 18, 2005  (DE) .................. 10 2005 002 414
Sep. 30, 2005  (DE) .................. 10 2005 046 804

(51) Int. Cl.
*F16D 65/40* (2006.01)
(52) U.S. Cl. ............. 188/73.38; 188/73.37; 188/73.36; 188/73.31
(58) Field of Classification Search ............ 188/72.4, 188/73.31, 73.36, 73.37, 73.38
See application file for complete search history.

(56) References Cited

U.S. PATENT DOCUMENTS

| | | | | |
|---|---|---|---|---|
| 3,768,605 A * | 10/1973 | Carre | ............ | 188/73.36 |
| 4,034,858 A * | 7/1977 | Rath | ............ | 188/73.34 |
| 4,056,174 A * | 11/1977 | Wienand et al. | ............ | 188/73.36 |
| 4,061,209 A * | 12/1977 | Gee et al. | ............ | 188/73.36 |
| 4,944,371 A * | 7/1990 | Giorgetti | ............ | 188/73.39 |
| 5,052,526 A * | 10/1991 | Weiler et al. | ............ | 188/73.44 |
| 5,064,028 A * | 11/1991 | Antony et al. | ............ | 188/73.38 |
| 5,111,914 A * | 5/1992 | Thiel et al. | ............ | 188/73.34 |
| 5,257,679 A * | 11/1993 | Weiler et al. | ............ | 188/73.32 |
| 6,719,104 B1 * | 4/2004 | Wemple et al. | ............ | 188/73.1 |

FOREIGN PATENT DOCUMENTS

| | | |
|---|---|---|
| DE | 1 199 552 | 8/1965 |
| DE | 25 58 141 | 7/1976 |
| DE | 32 27 195 A1 | 1/1984 |
| DE | 89 06 980 | 10/1990 |
| DE | 43 03 961 A1 | 8/1994 |
| EP | 0 072 192 A1 | 2/1983 |
| GB | 2 013 292 A | 8/1979 |
| JP | 06094055 A * | 4/1994 |

* cited by examiner

*Primary Examiner* — Robert A Siconolfi
*Assistant Examiner* — Mariano Sy
(74) *Attorney, Agent, or Firm* — RatnerPrestia

(57) ABSTRACT

A spot-type disc brake with a housing comprising a housing bridge, with at least one housing leg having an actuating assembly comprising an actuator unit and a component movable along an axis of movement. At least one brake shoe is arranged at the component and is slidably supported on at least one support. The brake shoe is braced with the support against an abutment surface by means of a hold-down spring. The abutment surface of the hold-down spring is arranged non-parallel to the axis of movement. Thereby, not only a radial preloading force $F_R$ is produced, but also a force component $F_x$ normal thereto, which assists the retracting movement of the brake shoe from the brake disc, thus improving the clearance behavior.

8 Claims, 2 Drawing Sheets

# PARTIALLY LINED DISK BRAKE

This application is the U.S. national phase application of PCT International Application No. PCT/EP2006/050287, filed Jan. 18, 2006, which claims priority to German Patent Application No. DE102005002414.9, filed Jan. 18, 2005 and German Patent Application No. DE102005046804.7, filed Sep. 30, 2005, the contents of such applications being incorporated by reference herein.

BACKGROUND OF THE INVENTION

1. Field of the Invention

The present invention relates to a spot-type disc brake, in particular for a motor vehicle, with a housing comprising a housing bridge, a first housing leg having an actuating unit and a second, outboard housing leg. In this arrangement, each one brake shoe with brake lining and back plate, acting upon a brake disc, is fitted at the inside surfaces of the housing legs. The housing and the brake shoes are slidably mounted on a mounting support on the vehicle in the direction of an axis of movement of the actuating unit. Further, a hold-down spring is provided on the side of the actuating unit between an abutment surface in the housing bridge and the brake shoe, the said spring preloading the brake shoe in relation to the mounting support and the abutment surface in order to prevent the brake shoe from rattling on the mounting support.

2. Description of the Prior Art

DE 25 58 141 A1 discloses a corresponding spot-type disc brake, which includes a piston-and-cylinder unit as actuating unit. When the brake is operated, the piston moves out of the cylinder and pushes the piston-side brake shoe against the brake disc until it abuts thereon. Now the piston-and-cylinder unit and the piston-side housing leg, respectively, moves away from the brake disc and pulls the opposite housing leg in the direction of the disc side there. As a result, the other brake shoe is also pressed against the brake disc, and both brake shoes exert a normal force on the brake disc. When the brake is released, hydraulic pressure does not prevail in the piston-and-cylinder unit, and the brake shoes exert no longer normal force on the brake disc. However, they still bear against the brake disc and, induced by friction, produce a residual brake torque, the so-called residual moment. In addition, the pads are thermally loaded to an increased degree, because no air flow develops between pad and disc, and pad and disc are not uncoupled thermally.

In view of the above, an object of the invention is to disclose a spot-type disc brake with a hold-down spring, which exhibits an improved clearance behavior of the brake shoes, that means that the residual moment is reduced and, further, pad and disc are uncoupled thermally.

SUMMARY OF THE INVENTION

According to one aspect of the invention, this object is achieved in that the abutment surface of the hold-down spring in the housing bridge is arranged anti-parallel to the axis of movement, along which the movable component of the actuating unit is moving. Thus, not only a radial preloading force is produced, which presses the brake shoe against the mounting support, but also a force component normal thereto. This fact assists the retracting movement of the brake shoe and the moving component of the actuating unit away from the brake disc and improves the clearance behavior because a small air slot develops between brake shoe and brake disc.

A favorable embodiment of the invention teaches that an angle α greater than 0° is provided between the abutment surface and the axis of movement, and the angle α lies in a plane defined by the axis of movement and by a force vector of the resulting spring force $F_F$. The result is that the spring, in addition to the radial preloading force $F_R$, produces an axial force component $F_X$ in parallel to the axis of movement, which returns the piston and the piston-side brake shoe into their initial position and, thus, improves the clearance operation.

It has shown that the force component $F_X$ that is in parallel to the axis of movement acts particularly effectively with regard to the clearance behavior when the angle α is greater than roughly 1.5°.

In an especially favorable embodiment of the invention, the angle α is limited to an area of approximately 1.5° to 11°. When the angle α exceeds 11°, the radial preloading force $F_R$ of the brake shoe will decrease in favor of the force component $F_X$ that is in parallel to the axis of movement to such an extent that no unfavorable operating performance results therefrom.

Due to the material combination of hold-down spring and housing bridge and because of the ambient conditions in the application, the contact area between hold-down spring and abutment surface is exposed to major corrosion. Therefore, it proves particularly favorable when at least one small, spot-like contact area is provided between the hold-down spring and abutment surface in the housing bridge in order to minimize the corrosion element and thereby reduce the corrosion.

To allow low-cost manufacture of the disc brake described above, abutment surface and housing bridge have an integral design. Additional costs of manufacture are not incurred due to the fact that abutment surface and housing bridge are produced in one casting operation.

In another favorable embodiment of the invention, abutment surface and housing bridge have a multi-part design. It can thus be ensured that, with an appropriate material selection, wear and/or corrosion of the abutment surface and spring can be slowed down when either especially hard and/or corrosion-inhibiting materials are used.

Furthermore, advantages with respect to the costs of manufacture are achieved when wire or leaf springs are used as hold-down springs because they can be procured in large quantities at favorable conditions due to their simple type of construction.

Further advantages of the invention become apparent especially when using hydraulic or electro-mechanical actuating units. Since only one active moving direction is mostly possible in a hydraulic actuating unit, there is no hydraulic retracting force for piston and brake shoe at all, with the result that the axial retracting force component $F_X$ of the spring force $F_F$ is of great significance with regard to the functions of the brake. The force component $F_X$ becomes especially necessary in the event of electromechanical actuation in case the actuating unit fails and is then no longer able to withdraw the brake shoe.

BRIEF DESCRIPTION OF THE DRAWINGS

Further details of the invention can be taken from the drawings by way of the description.

In the accompanying drawings.

DETAILED DESCRIPTION OF THE PREFERRED EMBODIMENTS

Figure 1:
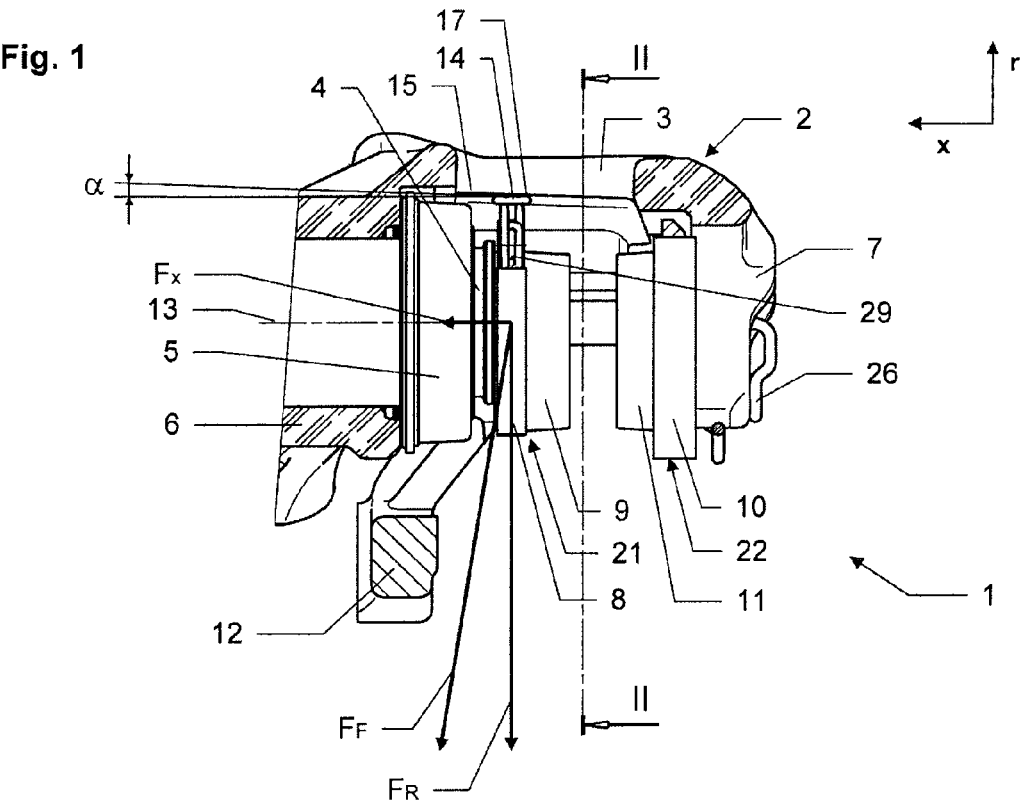
FIG. 1 is a first embodiment of the invention in a cross-section through a spot-type disc brake taken along line II-II.
Figure 2:
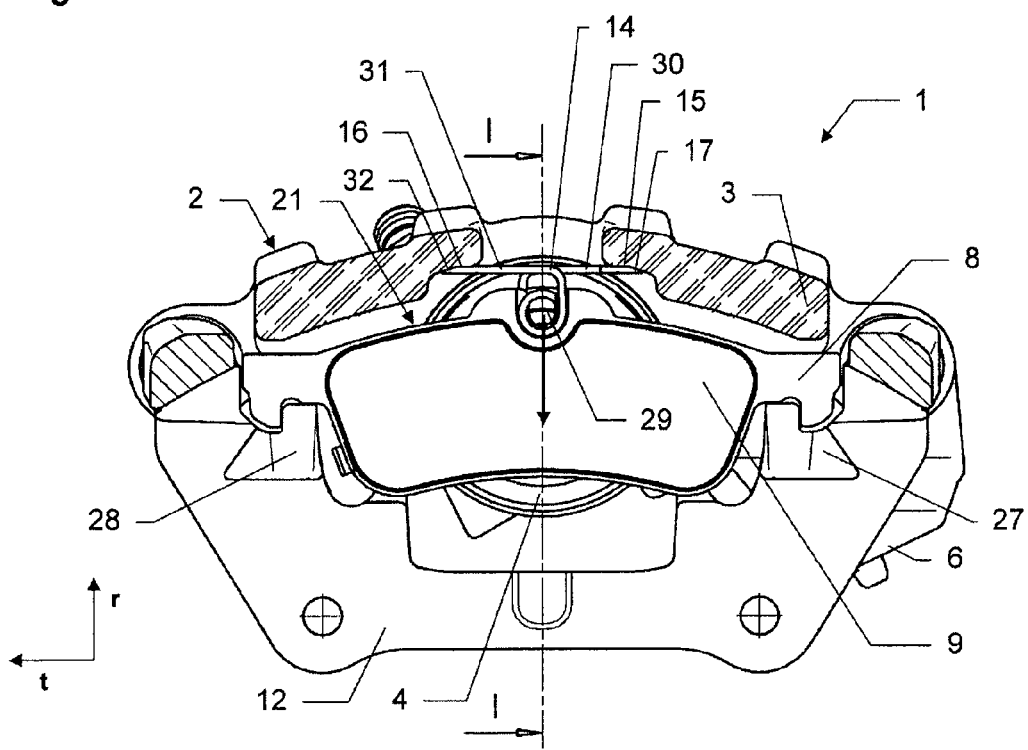
FIG. 2 is another view of the above-mentioned embodiment taken along the line of intersection I-I.

FIGS. 1 and 2 represent a first embodiment of a spot-type disc brake 1 in two sectional views. The spot-type disc brake 1 comprises a housing 2, which is composed of a first housing leg 6, a housing bridge 3, and a second housing leg 7 that is on the outside with respect to the housing. In this embodiment, a piston-and-cylinder unit 4, 5 is provided in the first housing leg 6, and a back plate 8 of a brake shoe 21 with brake lining 9 abuts on the piston 4 and is fixed there. Provided on the outboard housing leg 7 is another brake shoe 22 with back plate 10 and brake lining 11. The brake shoes 21, 22 act on parts of a brake disc (not shown). Housing 2 and brake shoes 21, 22 and their back plates 8, 10, respectively, are slidably mounted on two arms 27, 28 of a mounting support 12 in parallel to the axis of movement 13 of the piston-and-cylinder unit 4, 5. The housing 2 with the piston-side housing leg 6 is seated on two pins 20, 25 screwed into the mounting support 12. A spring 26 pulls the outboard housing leg 7 onto the arms 27, 28 of the mounting support (FIG. 3), whereby the brake shoe 22 is braced between the arms 27, 28 of the holder 12 and the housing bridge 3. Similarly, the brake shoe 21 with the back plate 8 is also slidably supported on the arms 27, 28 of the mounting support 12. To prevent rattling noise, bracing of the brake shoe 21 between the arms 27, 28 and the housing bridge 3 is produced by the hold-down spring 14. Spring 14 in this embodiment is fixed in an accommodation 29 on the back plate 8 of the brake shoe 21 and presses with two spring arms 30, 31 against two abutment surfaces 15, 16. As this occurs, only a spot-like contact 17, 32 is constituted between the spring arms 30, 31 and abutment surfaces 15, 16 in order to minimize the corrosion element that develops. The abutment surfaces 15, 16 are inclined at an angle α with regard to the axis of movement 13 of the piston-and-cylinder unit 4, 5, with the angle α lying in a plane that is defined at the accommodation by the axis of movement 13 and by a force vector of the of the resulting spring force $F_F$. A radial preloading force $F_R$, which acts perpendicular to the arms 27, 28 of the mounting support 12, ensues thereby from the spring force $F_F$. In addition, an axial force component $F_X$ that is in parallel to the axis of movement 13 is achieved, which acts on the piston 4 and the brake shoe 21. It should be noted that the mounting support 12 is provided also directly at the wheel suspension or at the spring strut of a vehicle, forming a component part therewith.

Embodiments are also feasible in which only one abutment surface or several abutment surfaces are provided in the housing bridge 3. The hold-down spring is then required to be configured accordingly in such a way that it develops, in interaction with one or more abutment surfaces, an axial force component $F_X$ of the spring force $F_F$, which is in parallel to the axis of movement 13 of the piston-and-cylinder unit 4, 5. It is exclusively significant in the configuration of one or more abutment surfaces that they are inclined at a determined angle α relative to the axis of movement 13, thus, acting as axial sliding slope(s), with the angle α lying in a plane, which is defined by the axis of movement 13 and by a force vector of the resulting spring force $F_F$.

Figure 3:
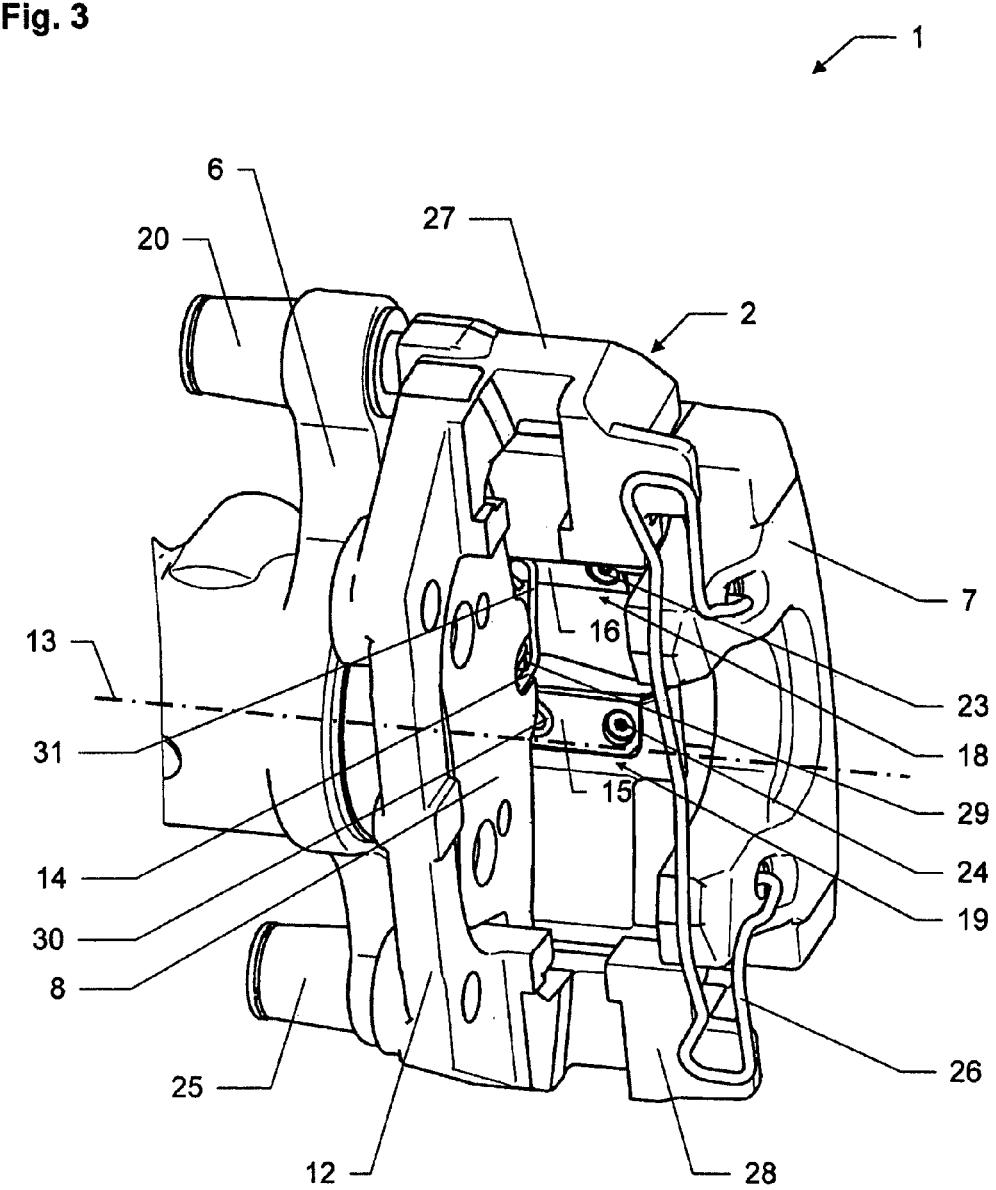
FIG. 3 is a perspective view of a spot-type disc brake according to another embodiment, in which the abutment surfaces are configured as add-on pieces.

FIG. 3 shows a perspective view of a spot-type disc brake 1 according to another embodiment, in which the abutment surfaces 15, 16 are realized as add-on pieces 18, 19. For better view of the arrangement, except for the piston-side back plate 8, both brake shoes are not shown. It thus becomes apparent in which manner the housing 2 with the housing leg 6 is displaceably attached on the mounting support 12 by way of the pins 20 and 25 and the brake shoes are braced between the abutment surfaces 15, 16 of the housing bridge 3 and the arms 27, 28 of the mounting support 12. Only the back plate 8, which abuts on the arms 27, 28, is illustrated in FIG. 3 representative of the brake shoe 21 as a whole. Fixed on the accommodation 29 of the back plate 8 is spring 14, which supports the back plate 8 with both spring arms 30, 31 in relation to the abutment surfaces 15, 16 or the add-on pieces 18, 19, respectively, bracing it with the arms 27, 28 of the mounting support 12. The add-on pieces 18, 19 are screwed to the housing bridge by means of screws 23, 24. However, other fixing provisions such as by way of positive and frictional engagement and by molecular bond, or any other connections, are also feasible without departing from the spirit of the invention. It is only relevant in this case that the abutment surfaces are formed of separate components, which bring about an axial force component $F_X$ in interaction with the hold-down spring 14.

The function of the spot-type brake disc 1 is as follows: The brake shoes 21, 22 are arranged between the housing 2 and the mounting support 12, and a hold-down spring 14 preloads the piston-side brake shoe 21 relative to the abutment surfaces 15, 16, pressing it against the arms 27, 28 of the mounting support 12 in order to prevent rattling noise. Due to the angle α of the abutment surface 15, 16, an axial force component $F_X$ being in parallel to the axis of movement 13 results from the spring force $F_F$ of the hold-down spring 14 relative to the radial preloading force $F_R$. When the brake is applied, hydraulic pressure develops in the piston-and-cylinder unit 4, 5, shifting the piston 4 out of the cylinder 5. The brake shoe 21 is hereby caused to move towards the brake disc until its lining 9 abuts thereon. Consequently, the piston-and-cylinder unit 4, 5 or the piston-side housing leg 6, respectively, moves away from the brake disc and pulls the opposite housing leg 7 via the housing bridge 3 in the direction of the brake disc side there. Hence, the other brake shoe 22 is also pressed against the brake disc, and both brake shoes 21, 22 exert a normal force on parts of the contact surfaces of the brake disc. When the brake is released, pressure is no longer applied to the piston-and-cylinder unit 4, 5, and the axial component $F_X$ of the spring force $F_F$, being in parallel to the axis of movement 13, shifts piston 4 and brake shoe 21 away from the brake disc into their initial position. It is thus ensured that the brake shoe 21 will not slide on the brake disc after the brake operation, thereby avoiding an unfavorable braking residual moment. Thus, the clearance behavior of the brake is significantly improved.

The invention claimed is:

1. Spot-type disc brake with a housing comprising:
a housing bridge, with at least one housing leg having an actuating assembly comprising an actuator unit and a component for moving at least one brake shoe along an axis of movement with respect to a disc brake,
wherein the brake shoe is arranged at the component and is slidably supported on at least one support, with a hold-down spring that generates a preloading force $F_R$ between the brake shoe and at least one abutment surface in the housing bridge, thus bracing the brake shoe with the support,
wherein a bearing surface of the hold-down spring is arranged non-parallel to the axis of movement, such that the hold-down spring biases the brake shoe along the axis of movement and away from the disc brake;

wherein an angle α between the abutment surface and the axis of movement is greater than roughly 1.5°, and the angle α lies in a plane defined by the axis of movement and by a force vector of the resulting spring force $F_F$.

2. Spot-type disc brake as claimed in claim 1, wherein at least one contact area between the bearing surface of the hold-down spring and abutment surface in the housing bridge has a shape similar to a spot.

3. Spot-type disc brake as claimed in claim 1, wherein the abutment surface and the housing bridge have an integral design.

4. Spot-type disc brake as claimed in claim 1, wherein the abutment surface and the housing bridge have a multi-part design and the abutment surface is provided by at least one add-on piece.

5. Spot-type disc brake as claimed in claim 1, wherein the hold-down spring is configured as a wire spring or leaf spring.

6. Spot-type disc brake as claimed in claim 1, wherein the actuating assembly is mainly based on a hydraulic or electromechanical function principle.

7. Spot-type disc brake as claimed in claim 1, wherein another brake shoe is mounted on an opposing housing leg, wherein, in operation, the component moves the at least one brake shoe along the axis of movement with respect to a disc brake, which causes the housing bridge to slide along the axis of movement to move said another brake shoe with respect to the disc brake.

8. Spot-type disc brake with a housing comprising:
a housing bridge, with at least one housing leg having an actuating assembly comprising an actuator unit and a component for moving at least one brake shoe along an axis of movement with respect to a disc brake,
wherein the brake shoe is arranged at the component and is slidably supported on at least one support, with a hold-down spring that generates a preloading force $F_R$ between the brake shoe and at least one abutment surface in the housing bridge, thus bracing the brake shoe with the support,
wherein a bearing surface of the hold-down spring is arranged non-parallel to the axis of movement, such that the hold-down spring biases the brake shoe along the axis of movement and away from the disc brake;
wherein an angle α between the abutment surface and the axis of movement is greater than 0°, and the angle α lies in a plane defined by the axis of movement and by a force vector of the resulting spring force $F_F$,
wherein the angle α amounts to approximately 1.5° to 11°.

* * * * *

UNITED STATES PATENT AND TRADEMARK OFFICE
CERTIFICATE OF CORRECTION

| | | |
|---|---|---|
| PATENT NO. | : 7,905,334 B2 | Page 1 of 1 |
| APPLICATION NO. | : 11/794368 | |
| DATED | : March 15, 2011 | |
| INVENTOR(S) | : Manfred Reuter et al. | |

It is certified that error appears in the above-identified patent and that said Letters Patent is hereby corrected as shown below:

On the Title page, Item [75], Inventors, delete "Sebastian Satzmann" and insert
--Sebastian Salzmann--

Signed and Sealed this
Fourteenth Day of June, 2011

David J. Kappos
*Director of the United States Patent and Trademark Office*